United States Patent [19]

Inoue et al.

[11] 3,962,069
[45] June 8, 1976

[54] SYSTEM FOR TREATING SLUDGE

[75] Inventors: Kiyoshi Inoue, Tokyo; Akihiko Shimizu, Isehara, both of Japan

[73] Assignee: Inoue-Japan Research Inc., Yokohama, Japan

[22] Filed: Sept. 23, 1974

[21] Appl. No.: 508,611

[30] Foreign Application Priority Data

Sept. 21, 1973 Japan.............................. 48-105933
Sept. 21, 1973 Japan.............................. 48-105934
Feb. 7, 1974 Japan.............................. 49-14883
Feb. 15, 1974 Japan.............................. 49-18831

[52] U.S. Cl............................ 204/300 R; 204/149; 204/152; 204/180 R; 210/47
[51] Int. Cl.² ........................................ B01D 13/02
[58] Field of Search................ 204/180 R, 149, 152, 204/300; 210/47

[56] References Cited
UNITED STATES PATENTS

| | | |
|---|---|---|
| 894,070 | 7/1908 | Schwerin ........................ 204/300 X |
| 2,900,320 | 8/1959 | Metcalfe et al..................... 204/300 |
| 3,436,326 | 4/1969 | Stober............................. 204/180 R |
| 3,506,562 | 4/1970 | Coackley........................ 204/149 X |
| 3,642,605 | 2/1972 | Chenel et al...................... 204/300 |
| 3,664,940 | 5/1972 | Greyson et al................. 204/300 X |
| 3,846,300 | 11/1974 | Inoue............................. 204/149 X |

Primary Examiner—John H. Mack
Assistant Examiner—A. C. Prescott
Attorney, Agent, or Firm—Karl F. Ross; Herbert Dubno

[57] ABSTRACT

A system for formation treatment of sludge in which an endless belt screen forms an electrode which extends over a portion of its path into the fluid sludge and is juxtaposed with another electrode therein so that the applicaton of an electrical potential across the electrodes results in the formaton of a consolidated and partly dewatered sludge deposit upon the screen electrode. The latter then carries the deposit to a drying chamber and preferably thereafter to an incinerator chamber in which the sludge deposit is incinerated alternatively, the dry sludge layer can be removed.

9 Claims, 9 Drawing Figures

SYSTEM FOR TREATING SLUDGE

The present invention relates to a system for treating sludge and, more particularly, to a sludge treatment system utilizing electrochemical dewatering and consolidation in a novel manner, especially for treatment of sludge continuously for disposal and reclamation and useful for processing domestic and industrial sewage effluents.

One of the major problems in the treatment of industrial and domestic sewage effluents is the efficient and economical treatment of sludges which may be the original effluents or may be the products of preliminary filtration and other processing of such effluents. These sludges must, to reduce their bulk and also from the point of view of environmental protection requirements, be dewatered and consolidated sufficiently for suitable disposal such as incineration and, to this end, it is of great importance that they should become to contain, say, less than 60% water. In order to achieve this object, various processes have been applied including chemical conditioning, drying, mechanical dewatering and electrochemical consolidation. However, none of the existing systems utilizing or combining these processes has proved to be satisfactory from economical standpoints.

It is, therefore, the object of the present invention to provide a system which is capable of treating sludge economically and more efficiently than existing systems to render it ready for disposal or reclamation.

In accordance with the present invention, there is provided a sludge treatment system which utilizes electrochemical dewatering and consolidation in a novel manner in the system. The term "electrochemical dewatering and consolidation" is herein intended to refer to a combined action of electro-osmosis and electrophoresis and possibly also electrochemical oxidation and all other reactions which take place to contribute to dewatering and consolidation of a sludge upon application of an electric potential thereacross.

The first electrode for the electrochemical dewatering and consolidation in accordance with a novel feature of the present invention is constituted by an electrically conductive member having an endless and screen-like perforated surface continuously displaceable along a predetermined path into, through and out of, a bath of sludge to be treated and retained in a vessel. A second electrode is provided juxtaposed with the first electrode in the bath while a power supply is connected to the first and second electrodes for applying an electric potential thereacross to electrochemically effect flow of water from the sludge through the perforations of the surface and form on the latter a deposit of consolidated sludge within the bath. Means is provided at a location along said predetermined path which is downstream of the bath to remove the deposit from said surface for disposal.

Preferably, heater means is also provided along the path and between the bath and the removal means for drying the consolidated sludge deposit to facilitate its removal from the surface.

The removal means advantageously includes an incinerator adapted to place the deposit in an incineratable condition. Ashes removed from the surface as a product of the incineration may be collected for disposal, for example, for return to the land or reclamation as a fertilizer, fuel or raw material for the production of activated carbon etc.

The heater means and said incinerator may include their respective chambers covering stretches of the displaceable surface carrying the consolidated sludge deposit continuously formed thereon in the bath and these chambers may be coupled by a conduit so that heat generated in the incinerator may be used for drying said deposit prior to incineration thereof.

In accordance with a further aspect of the present invention, means is preferably provided to insure constancy of the water content of the consolidated sludge deposit continuously formed on the belt electrode and/or the dried deposit resulting from passage of the deposit through the chamber.

It has been found to be also advantageous to insure constancy in the thickness of the consolidated sludge deposit continuously formed on the belt electrode. This can be achieved by measuring the electric current passing between the belt electrode and the counterelectrode and, in accordance therewith, controlling the rate of the displacement of the belt electrode.

The above and other object, features and advantages of the present invention will become more readily apparent from the following description (which is given by way of example only), reference being made to the accompanying drawing in which.

Figure 1:
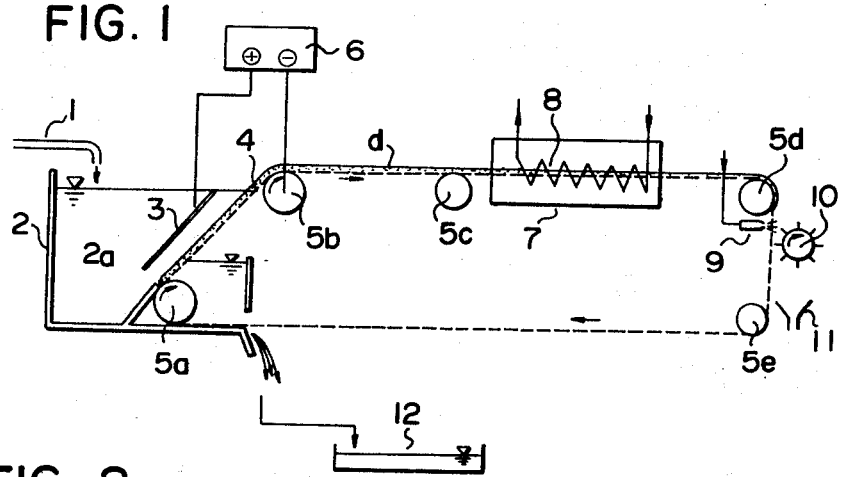
FIG. 1 is a diagrammatic, sectional view of a system embodying the present invention.

In FIG. 1, sludge to be treated is introduced by a conduit 1 into a vessel 2 and retained therein in the form of a bath 2a receiving a stationary electrode 3. Shown at 4 is an electrically conductive, endless, screen belt continuously displaceable by a suitable motor (not shown) over rollers 5a, 5b, 5c, 5d and 5e adapted to be passed through the bath 2a and spacedly juxtaposed with the stationary electrode 3, the belt 4 forming a counterelectrode in the sludge bath 2a. A potential source 6 is connected to the stationary electrode 3 and the displaceable screen belt electrode 4, to the latter via the roller 5b which is electrically conductive, with the polarity determined depending on the nature of the sludge so as to electro-osmotically effect flow of water from the sludge through the screen mesh and electrophoretically, more generally, electrochemically form a deposit of consolidated sludge d on the screen electrode 4. The latter, in addition to a good electrical conductivity, should have heat and corrosion resistance and may be stainless steel.

The consolidated sludge deposit d continuously formed on the screen belt electrode 4 and which has reduced its water content to, say a value between 96 and 90% from 99% as it was introduced from the conduit 1, is carried with the belt 4 out of the bath and then to a dryer stage comprising a heating chamber 7 in which a hot air current 8 is circulated to further reduce the water content of the deposited sludge d to, say, 60% or less.

The dried sludge deposit d is then carried to a removal stage in which it is subjected to an air blast from a nozzle 9 and to a scraping action by a rotary brush 10 to leave the belt conveyer 4 for collection by a receptacle 11. At this stage, vibration may also be imparted to the belt 4.

The removal stage also insures scrubbing of the screen electrode 4 which is returned to the bath 2a in the vessel 2 in which to act to dewater and to receive the sludge. The water separated from the sludge in the vessel 2 is drained to a storage tank 12.

Figure 2:
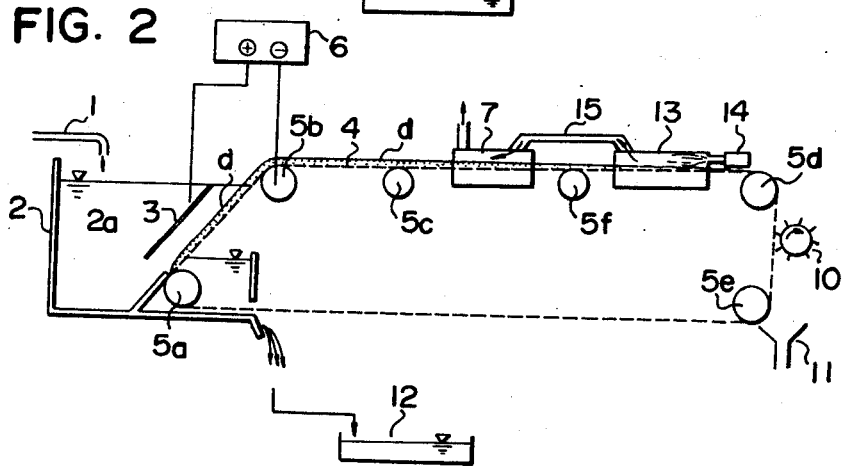
FIG. 2 is a diagrammatic, sectional view of another embodiment of the present invention.

In the embodiment of FIG. 2, the removal stage includes an incinerator chamber 13 covering a stretch of the belt 4 downstream of the dryer chamber 7 and including a burner 14 designed to apply heat sufficient to cause the dried sludge deposit d on the belt 4 to incinerate. The incinerator chamber 13 is coupled to the dryer chamber 7 via a conduit 15 through which the heat generated in the incinerator chamber 13 propagates to the dryer 7 and is used to dry at this latter preceding stage the sludge d on the belt 4 to be carried over a further roller 5f into the incinerator chamber 13. Downstream of the incinerator 14, the belt 4 is subjected to scrubbing by a rotary brush 10 whereby incineration products which may remain on the belt 4 are removed for collection by receptacle 11.

Figure 3:
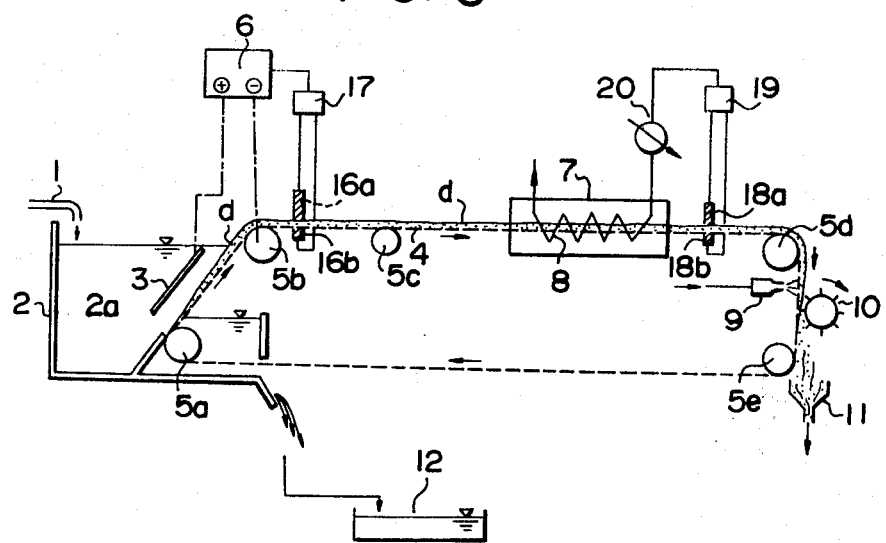
FIG. 3 is a diagrammatic, sectional view of a further embodiment of the present invention including means for insuring constancy in the water content of the consolidated sludge deposit on the belt electrode.

A system shown in FIG. 3 comprises basically the arrangement of FIG. 1 and incorporates means for maintaining the water content of the consolidated sludge deposit d continuously formed essentially constant by controlling at least one operating parameter based on the measurement of the water content of the sludge d deposited and/or of the sludge subjected to drying. It has been found that the water content can be ascertained by detecting electrical resistance across the deposited later.

Accordingly, the system of FIG. 3 includes a pair of sensing electrodes 16a and 16b each of which preferably is in the form of a roller and which are disposed as shown in contact with the deposited layer d carried over the roller 5b from the bath 2a to measure the electrical resistance across the deposit d. A control circuit 17 is connected with these electrodes to receive a signal indicative of the measured value thereby controlling the potential supply 6 so that the deposit d continuously formed in the bath 2a and carried therefrom should have a predetermined electrical resistance corresponding to a desired water content, say, 90%.

Similarly, sensing electrodes 18a and 18b, again each in the form of a roller, are provided downstream of the heater 7 and designed to ascertain the water content of the dried deposit d by measuring the electrical resistance thereacross thereby a control circuit 19 to control the heater 20 so as to increase or decrease the temperature of the drying air current 8 to control the electrical resistance between the electrodes 18a and 18b at a predetermined value corresponding to a desired water content of the dried deposit d, say, 60%.

Figure 4:
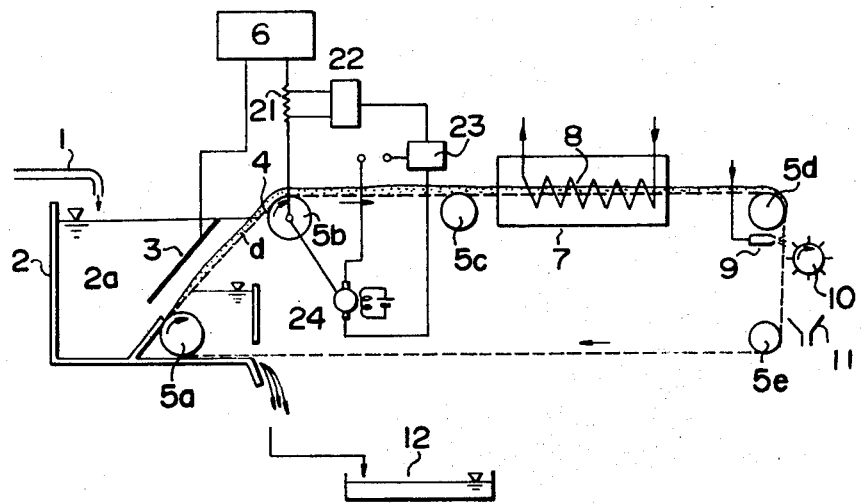
FIG. 4 is a diagrammatic, sectional view of a still further embodiment of the present invention including means for insuring constancy in the thickness of the consolidated sludge deposit formed on the belt electrode.

A system shown in FIG. 4 is designed to control the thickness of the consolidated sludge deposit d continuously formed on the conveyer belt electrode to an essentially constant value. To this end, a sensing resistor 21 is incorporated in circuit with the potential source 6 and the electrodes 3 and 4 to detect the electric current passing through the gap between them. A signal indicative of the gap current is produced by a monitoring circuit 22 and applied to a control circuit 23 which, in accordance therewith, controls a motor 24 included to displace the belt electrode 4 in such a manner that increase in the gap current indicative of increase in the thickness of the deposit d may increase the rate of displacement of the belt electrode 4 and decrease in the gap current indicative of decrease in the deposit thickness may decrease the rate of displacement to insure constancy in the thickness of the deposit continuously formed on the belt electrode 4.

Figure 5:
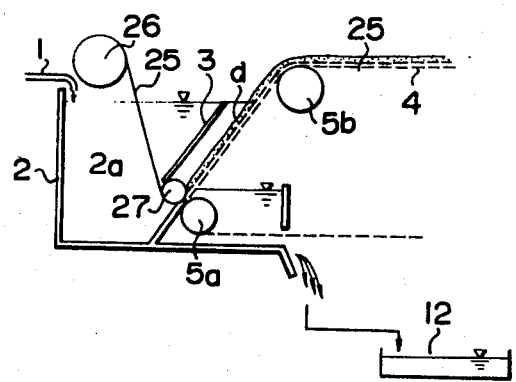
FIG. 5 is a diagrammatic, sectional view of a modified arrangement of the conveyer system which can be used with the embodiments of FIGS. 1 to 4.

FIG. 5 shows an arrangement which may be used with the embodiments of the invention described previously. This arrangement makes use of paper or cloth to serve as an electrically non-conductive filter and is especially advantageous where a screen electrode 4 of a satisfactory mesh and adequate to serve as electroosmotic membrane is not available. The paper or cloth 25 is supplied from a roll 26 and passed over a roller 27 in the vicinity of the roller 5a where it covers the screen electrode 4 to serves as filter to sludge particles and to permit a deposit of consolidated sludge d to build up thereon as it is displaced with the screen electrode 4 in the sludge bath 2a. As an alternative of paper or cloth, it is possible to use a film of cellulose which may be applied to the surface of the screen electrode 4 upstream of the bath 2a.

Figure 6:
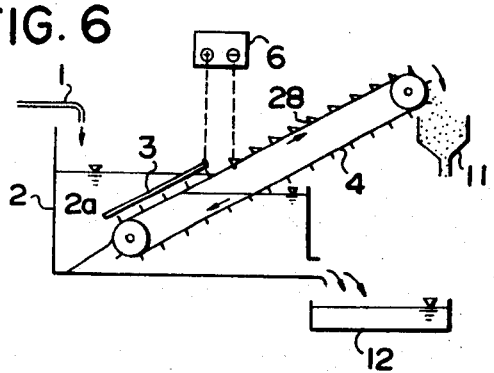
FIG. 6 is a diagrammatic, sectional view of yet another embodiment of the present invention including a further modified conveyer arrangement.
Figure 7:
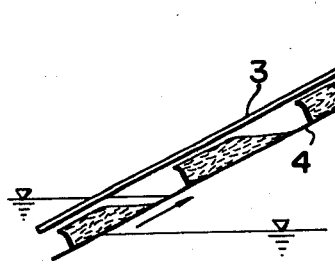
FIG. 7 is a diagrammatic, sectional enlarged view of a portion of the system of FIG. 6.

In FIG. 6 there is shown an improved conveyer system using a belt electrode 4 formed with a series of outwardly projecting plates 28 composed of a flexible, electrically nonconductive material and each of which spans the width of the belt 4 in its width and the gap between the electrodes 3 and 4 in its height. These plates 28 serve as spacers for the belt electrode 4 and the stationary electrode 3 against possible contact or short-circuiting therebetween during the treatment operation and also as dams for sludge electrochemically dewatered and consolidated upon the belt electrode 4 against slipping as it is raised from the bath 2a, as will be better seen from FIG. 7.

Figure 8:
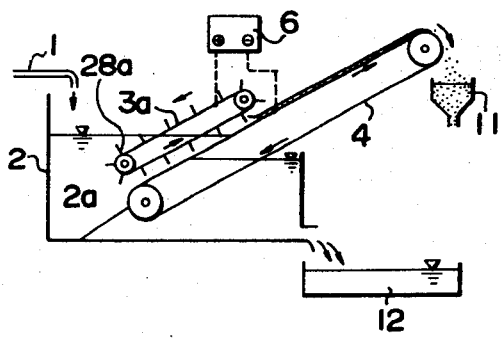
FIG. 8 is a diagrammatic, sectional view of yet a further embodiment of the present invention including a further modification of the conveyer arrangement.

A modification of the system of FIG. 6 is shown in FIG. 8. This modification replaces the stationary electrode 3 by an endless belt electrode 3a on which are formed a series of spacer/dam plates 28a as just described. The second belt electrode 3a is continuously displaced in the direction of the arrow as shown as the sludge receiving belt electrode 4 is displaced in the course of the treatment operation. Although not shown in the Figure, this system may include a dryer and further an incinerator as shown in and described in connection with, FIGS. 1 and 2.

Figure 9:
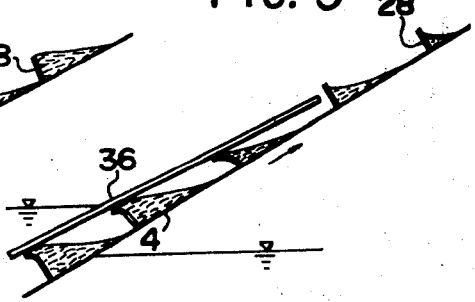
FIG. 9 is a diagrammatic, sectional view of a modification of the electrode arrangement of FIGS. 6 and 7.

FIG. 9 represents a modified, preferred electrode arrangement which may be used with the embodiment of FIG. 6. This arrangement utilizes a stationary, plate electrode 36 which is unparallel with and upwardly approaching to the sludge receiving belt electrode 4 continuously displaceable and is designed to compensate for decrease in electrical conductivity between the two electrodes as sludge is consolidated upon the belt electrode 4 and hence to eliminate a loss of electric power due to such decrease.

We claim:

1. A system for treating sludge comprising:
   a vessel for receiving a bath of the sludge;
   an electrically conductive member having an endless and screen-like perforated surface continuously displaceable through and outside of said bath along a predetermined path and forming a first electrode;
   means for displacing said surface along said predetermined path;
   a second electrode spacedly juxtaposed with said first electrode in said bath;
   a power supply for applying an electric potential across said first and second electrodes to electrochemically effecting flow of water from said sludge through the perforations of said surface and form on the latter a deposit of consolidated sludge within said bath;
   means disposed in said path and downstream of the bath for removing said deposit from said surface for disposal or reclamation; and
   means for detecting the water content of said deposit on said surface carried from said bath to produce an electrical signal indicative of the detected value and means responsive to said signal for controlling said potential source so as to maintain the water content of said deposit at a desired value.

2. A system for treating sludge comprising:
   a vessel for receiving a bath of the sludge;
   an electrically conductive member having an endless and screen-like perforated surface continuously displaceable through and outside of said bath along a predetermined path and forming a first electrode;
   means for displacing said surface along said predetermined path;
   a second electrode spacedly juxtaposed with said first electrode in said bath;
   a power supply for applying an electric potential across said first and second electrodes to electrochemically effecting flow of water from said sludge through the perforations of said surface and form on the latter a deposit of consolidated sludge within said bath;
   means disposed in said path and downstream of the bath for removing said deposit from said surface for disposal or reclamation;
   heater means disposed in said path between said bath and said means for removal for drying said deposit prior to its removal from said surface;
   means for detecting the water content of said deposit on said surface passed through said heater means to produce an electrical signal indicative of the detected value and means responsive to said signal for controlling said heater means so as to maintain the water content of said deposit at a desired value.

3. A system for treating sludge comprising:
   a vessel for receiving a bath of the sludge;
   an electrically conductive member having an endless and screen-like perforated surface continuously displaceable through and outside of said bath along a predetermined path and forming a first electrode;
   means for displacing said surface along said predetermined path;
   a second electrode spacedly juxtaposed with said first electrode in said bath;
   a power supply for applying an electric potential across aid first and second electrodes to electrochemically effecting flow of water from said sludge through the perforations of said surface and form on the latter a deposit of consolidated sludge within said bath;
   means disposed in said path and downstream of the bath for removing said deposit from said surface for disposal or reclamation; and
   means for detecting the thickness of said deposit formed on said surface to produce a signal indicative of the detected value and means responsive to said signal for controlling the rate of displacement of said surface by applying said signal to said means for displacement so as to maintain the thickness of said deposit at a desired value.

4. A system for treating sludge comprising:
   a vessel for receiving a bath of the sludge;
   an electrically conductive member having an endless and screen-like perforated surface continuously displaceable through and outside of said bath along a predetermined path and forming a first electrode;
   means for displacing said surface along said predetermined path;
   a second electrode spacedly juxtaposed with said first electrode in said bath;
   a power supply for applying an electric potential across said first and second electrodes to electrochemically effecting flow of water from said sludge through the perforations of said surface and form on the latter a deposit of consolidated sludge within said bath;
   means disposed in said path and downstream of the bath for removing said deposit from said surface for disposal or reclamation; and
   means for applying a porous film of an electrically nonconductive material upon said surface to permit said deposit of consolidated sludge to build up upon said film.

5. A system for treating sludge comprising:
   a vessel for receiving a bath of the sludge;
   an electrically conductive member having an endless and screen-like perforated surface displaceable through and outside of said bath along a predetermined path and forming a first electrode;
   means for continuously displacing said surface along said predetermined path;
   a second electrode spacedly juxtaposed with said first electrode in said bath;
   a power supply for applying an electric potential across said first and second electrodes to electrochemically effect flow of water from said sludge through the perforations of said surface and form thereon a deposit of consolidated sludge;
   heater means disposed in said path and downstream of said bath for drying said deposit continuously displaced from said bath to render it thermally decomposable; and
   incinerator means disposed in said path and downstream of said heater means upstream of said bath for incinerating said deposit continuously carried from said heater means to thermally decompose it directly on said surface.

6. A system as defined in claim 5 wherein said heater means and said incinerator means includes their respective chambers receiving stretches of said surface, said system further including a conduit communicating said chambers with one another for transmitting heat generated in said incinerator chamber to said heat chamber for drying said deposit therein.

7. A system for treating sludge comprising:
a vessel for receiving a bath of the sludge;
an electrically conductive member having an endless and screen-like perforated surface continuously displaceable through and outside of said bath along a predetermined path and forming a first electrode;
means for displacing said surface along said predetermined path;
a second electrode spacedly juxtaposed with said first electrode in said bath;
a power supply for applying an electric potential across said first and second electrodes to electrochemically effect flow of water from said sludge through the perforations of said surface and forms thereon a deposit of consolidated sludge; and
means disposed in said path and downstream of the bath for removing said deposit from said surface for disposal or reclamation, said surface being formed with a series of plates outwardly protruded therefrom and composed of a flexible electrically nonconductive material for serving as dams for the deposited sludge against slipping as it is raised from said bath.

8. A system for treating sludge comprising:
a vessel for receiving a bath of the sludge;
an electrically conductive member having an endless and screen-like perforated surface continuously displaceable through and outside of said bath along a predetermined path and forming a first electrode;
means for displacing said surface along said predetermined path;
a second electrode spacedly juxtaposed with said first electrode in said bath;
a power supply for applying an electric potential across said first and second electrodes to electrochemically effect flow of water from said sludge through the perforations of said surface and form thereon a deposit of consolidated sludge; and
means disposed in said path and downstream of the bath for removing said deposit from said surface for disposal or reclamation, said second electrode comprising an endless, continuously displaceable endless belt formed with a series of electrically nonconductive, flexible plates outwardly protruded therefrom for serving as dams for the deposited sludge against slipping as it is raised from said bath.

9. A system defined in claim 8 wherein said second electrode is upwardly approaching to said surface.

* * * * *